May 10, 1949.  R. J. STIFFLEMIRE  2,469,527
SAW FILING STAND
Filed July 9, 1947
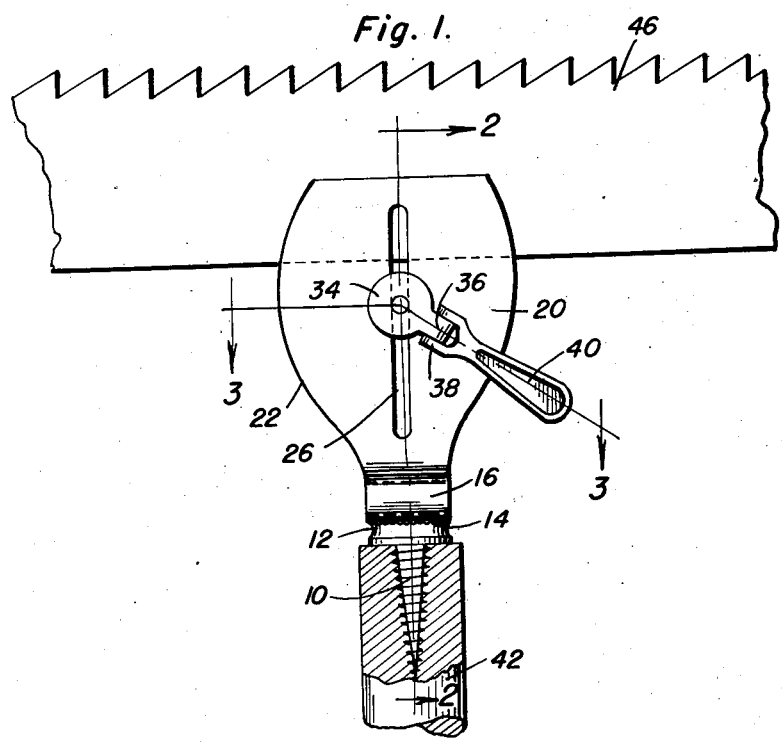
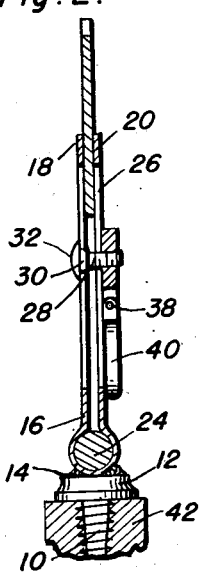
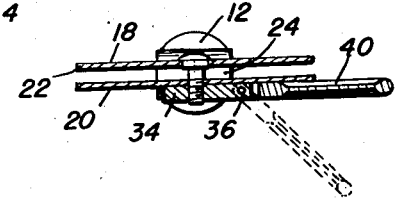
Inventor
Robert J. Stifflemire
By *Clarence A. O'Brien and Harvey B. Jacobson*
Attorneys Patented May 10, 1949

2,469,527

UNITED STATES PATENT OFFICE 2,469,527

SAW FILING STAND

Robert J. Stifflemire, Dickinson, Ala.

Application July 9, 1947, Serial No. 759,748

3 Claims. (Cl. 76—78)

This invention relates to new and useful improvements in saw filing stands and the primary object of the present invention is to provide a device for conveniently supporting a saw to be sharpened, on a ground surface as well as a wooden or other types of supporting surfaces.

Another important object of the present invention is to provide a stand of the character referred to, including a pair of gripping jaws and novel and improved means for clamping said jaws to a saw or the like to the work.

A further object of the present invention is to provide a saw filing stand wherein the saw to be filed may be retained at a selected vertically inclined angle for accessibility thereto.

A still further aim of the present invention is to provide a saw filing stand that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which—

Figure 1 is a fragmentary side elevational view of a cross saw supported by the present invention, and with parts broken away and shown in section;

Figure 2 is a longitudinal vertical sectional view taken substantially on the plane of section line 2—2 of Figure 1; and, Figure 3 is a sectional view taken substantially on the plane of section line 3—3 of Figure 1.

Referring now to the drawing in detail, wherein for the purpose of illustration, there is disclosed a preferred embodiment of the present invention, the numeral 10 represents a tapered externally threaded shank provided with a retaining collar 12 at its enlarged head.

Fixedly secured to the collar by welding or the like 14, is the lower periphery of a substantially U-shaped member 16 having a pair of integral gripping jaws 18 and 20, the side edges 22 of which are preferably arcuate. These jaws 18 and 20 are of a width greater than the width of member 16.

A shaft 24 mounted in the lower portion of member 16, normally retains the jaws 18 and 20 spaced relative to each other.

Opposed slots 26 are provided in the jaws 18 and 20 and slidably receive a portion of a bolt or threaded rod 28. This bolt is provided with a preferably hexagonal flange 30 adjacent its head 32, that engages one of the slots to prevent rotation of the rod during adjusted sliding movement. Receivably engaged on the threaded end of rod 28 projecting outwardly of the jaw 20, is preferably a circular plate or member 34 having an outwardly projecting integral arm 36, to which is pivotally mounted the bifurcated end 38 of a handle 40.

In practical use of the device, the shank is engaged in the upper end of a supporting member or shaft 42 tapered or pointed at its lower end 44 to be forced into a ground surface at a selected point. One edge of an article to be worked, such as a saw 46, is then slipped between jaws 18 and 20 and by rotating handle 40, the jaws are clamped to the saw so that the same may be filed or the like. Obviously, the axis of the saw may be disposed at a selected vertical angle with the axis of shank 10, facilitating sharpening of an end of the saw without the user having to bend over the same. Also, the shank itself may be engaged with a wooden surface or the like without the necessity of having to use the supporting element 42.

In view of the foregoing description taken in conjunction with the accompanying drawing it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A saw filing stand comprising a tapered externally threaded shank, a retaining collar at one end of said shank, a U-shaped member fixedly secured to said collar, means carried by said U-shaped member for normally retaining the free ends of said member spaced, a pair of spaced gripping jaws integrally formed with said U-shaped member, opposed slots provided in said jaws, an externally threaded rod slidably mounted in said slot, means preventing rotation of said rod, a member receivably engaging one end of said rod, and a handle pivoted to said member for actuating said jaws.

2. A saw filing stand comprising an anchor member having a pointed extremity adapted to be inserted in the ground, a U-shaped member, means removably securing said U-shaped member to said anchor member, a pair of movable jaws integrally formed with the legs of said U-shaped member and having opposed longitudinal slots, means received in said U-shaped member normally urging said jaws to spread position, a bolt slidably received in said slots and including a threaded portion, a nut receivably engaged on the threaded portion of said bolt, and hand gripping means pivoted on said nut for rotating said nut and moving said bolt longitudinally in said slots.

3. The combination of claim 2 wherein said means received in said U-shaped member normally urging said jaws to spread position includes a shaft.

ROBERT J. STIFFLEMIRE.

REFERENCES CITED

The following references are of record in the file of this patent:

UNITED STATES PATENTS

| Number | Name | Date |
|---|---|---|
| 66,754 | Van Etten | July 16, 1867 |
| 130,206 | Fonda | Aug. 6, 1872 |
| 177,215 | Day | May 9, 1876 |
| 358,842 | Coxhead | Mar. 8, 1887 |
| 425,332 | Lewis | Apr. 8, 1890 |
| 792,998 | Loken | June 20, 1905 |
| 815,462 | McLean | Mar. 20, 1906 |
| 1,063,292 | Schilders et al. | June 3, 1913 |
| 1,084,824 | Shaules et al. | Jan. 20, 1914 |
| 1,135,815 | King | Apr. 13, 1915 |
| 1,180,422 | Paro | Apr. 25, 1916 |
| 1,209,451 | King | Dec. 19, 1916 |
| 1,290,817 | Well | Jan. 7, 1919 |
| 1,565,828 | Szako | Dec. 15, 1925 |
| 2,258,969 | Brown | Oct. 14, 1941 |